June 1, 1948.    N. I. KORMAN    2,442,606
PHASE INDICATING REFLECTOMETER
Filed Dec. 28, 1945    2 Sheets—Sheet 1
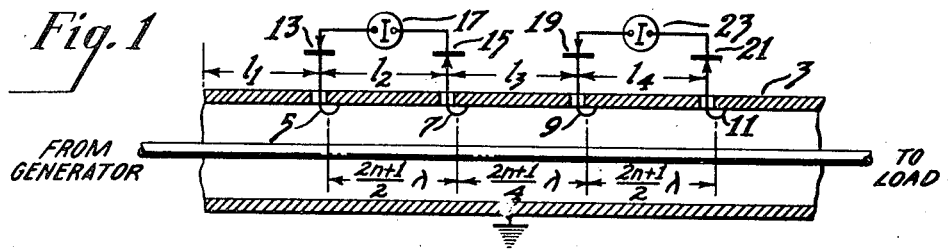
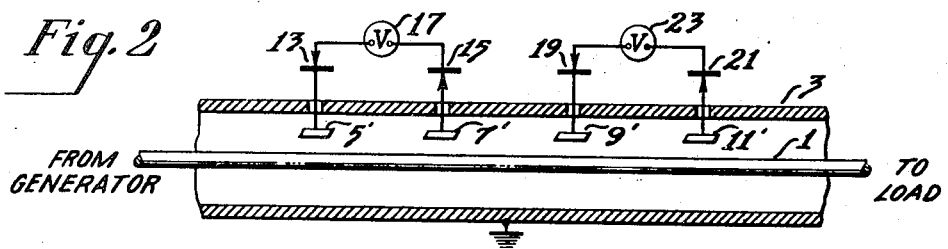
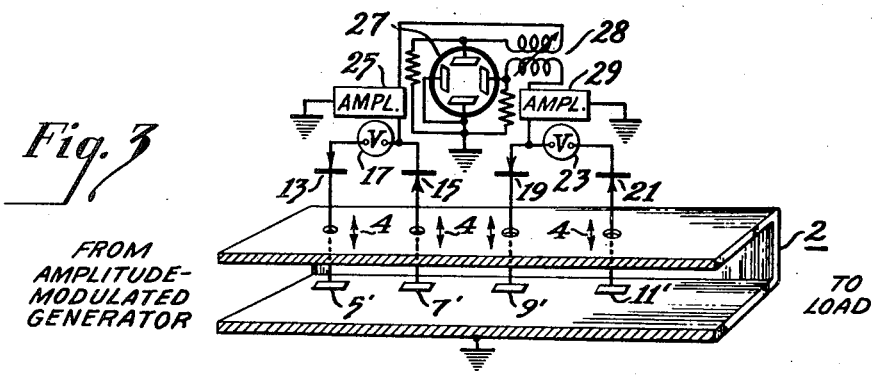
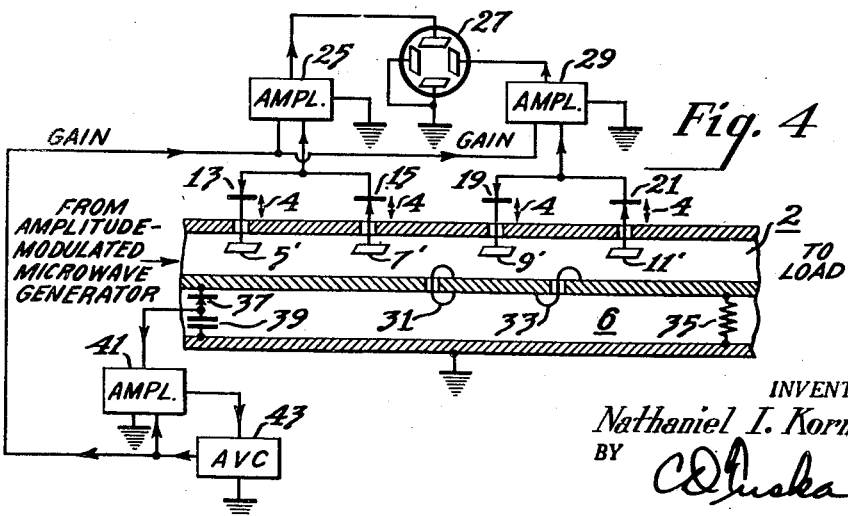
INVENTOR.
Nathaniel I. Korman
BY
ATTORNEY

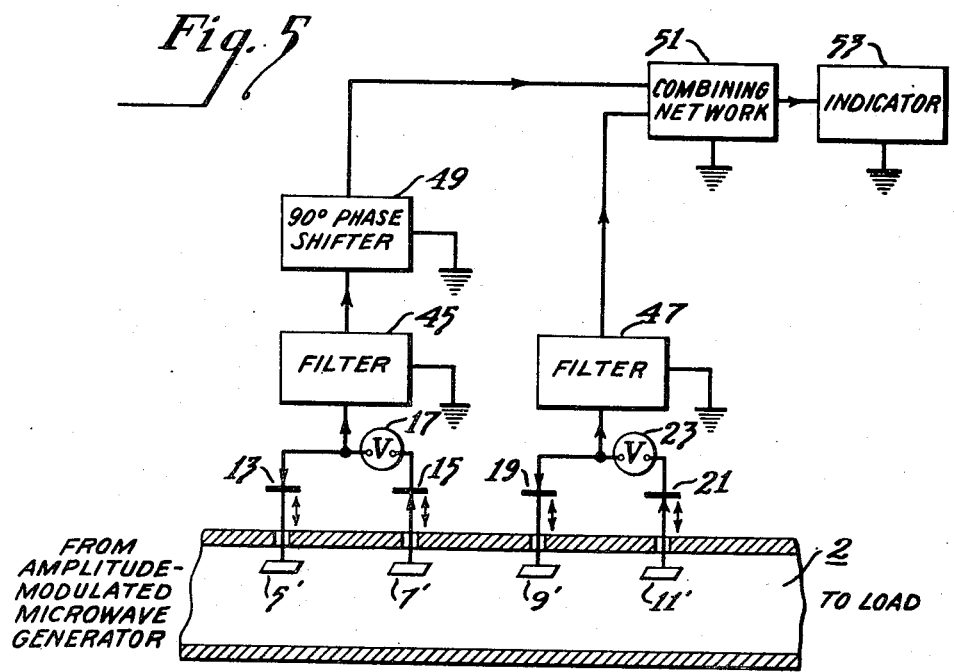

Patented June 1, 1948

2,442,606

UNITED STATES PATENT OFFICE 2,442,606

PHASE INDICATING REFLECTOMETER

Nathaniel I. Korman, Camden, N. J., assignor to Radio Corporation of America, a corporation of Delaware Application December 28, 1945, Serial No. 637,685

15 Claims. (Cl. 172—245)

This invention relates generally to high-frequency wave transmission and more particularly to reflectometers for measuring directly the phase and magnitude of reflected waves on a transmission line or waveguide.

The most useful measurements customarily made on transmission lines or waveguides are the measurement of the standing wave ratio and reflection coefficient. The same information obtainable from standing wave ratio measurements may be obtained by measuring separately the forward and backward travelling wave magnitudes. Ordinary measurements of the standing wave ratio require the use of a movable probe in order to determine the wave magnitude at various predetermined points along the transmission line. Movable elements in ultra-high-frequency coaxial transmission lines and waveguides involve difficulties due to imperfect electrical contact between the transmission line and the movable probe element which may introduce considerable error in the standing wave measurements. Furthermore, standing wave ratio measurements heretofore have necessitated a series of at least two consecutive measurements of wave magnitude at different points along the transmission line.

Heretofore attempts to measure separately the magnitudes of the forward and backward travelling waves without the necessity of a probe element have been limited to measurements at a single frequency or to apparatus wherein the transmitted energy is continuously coupled to the measuring apparatus over distances comparable to one-half, or preferably several wavelengths, at the operating frequency.

In applicant's copending application Serial No. 528,655, filed March 29, 1944, now Patent Number 2,423,390, separate measurements of the magnitudes of forward and backward travelling waves in a transmission line or waveguide are obtainable without the limitation of frequency selectivity in the measuring apparatus. Said copending application discloses a system which contemplates the use of two separate lumped wave pickup and measuring devices, each polarized to detect and indicate the magnitudes of waves travelling in different directions along the transmission line. The system provides accurate standing wave ratio measurements over a relatively wide frequency band and employs two wave pickup coupling means of opposite sense for detecting separately the forward and backward travelling waves. Either inductive or capacitive coupling probes of opposite sign may be utilized.

The instant invention contemplates an improvement upon the system disclosed and claimed in said copending application in that direct indications may be provided of the phase as well as of the magnitude of the reflected wave upon a transmission line or waveguide. On a transmission line or waveguide, a probe type wave indicator responsive to the square of the voltage (or current) on the line has an output in terms of the travelling waves on the line equal to $$e_1 = K|fe^{-j\beta l_1} + be^{j\beta l_1}|^2 \quad (1)$$

where $f$ is the forward travelling wave on the line, $b$ is the backward travelling wave on the line, $K$ is a sensitivity factor, $l_1$ is the distance of the probe from a point of reference on the line and $\beta = 2\pi/\lambda$ is the propagation factor on the line. This equation may be simplified as follows:

$$e_1 = KF^2|1 + re^{2j\beta l_1}|^2 = KF^2|1 + Re^{2j\beta l_1 + jp}|^2$$

$$= KF^2[\{1 + R\cos(2\beta l_1 + p)\}^2 + R^2\sin^2(2\beta l_1 + p)]$$

$$= KF^2[(1+R^2) + 2R\cos(2\beta l_1 + p)] \quad (2)$$

where $r = Re^{jp} = b/f$ is the reflection coefficient and $F$ is the magnitude of the forward travelling wave.

Another probe identical to the first probe at a position $l_{20} = (l_1 + l_2)$ from said reference point on the line has an output $e_2$ equal to $$e_2 = KF^2[(1+R^2) + 2R\cos(2\beta l_{20} + p)] \quad (3)$$

The difference of the outputs of the first and second probes is indicated by $$e_1 - e_2 = 2KF^2R[\cos(2\beta l_1 + p) - \cos(2\beta l_{20} + p)] \quad (4)$$

Employing the trigonometrical transformation for the difference of two cosines $$e_1 - e_2 = 4KF^2R \sin(p + \beta l_1 + \beta l_{20}) \sin(\beta l_{20} - \beta l_1) \quad (5)$$

Thus if $$\beta l_1 + \beta l_{20} = q\pi, \quad q = 0, 1, 2 \ldots \quad (6)$$

$$\beta l_{20} - \beta l_1 = \frac{2n-1}{2}\pi, \quad n = 1, 2, 3 \ldots \quad (7)$$

then $$e_1 - e_2 = 4KF^2R \sin p \quad (8)$$

If in addition two more probes identical to the first two, having different positions $l_{30}$ and $l_{40}$ with respect to the reference point on the line $$\left(\text{assuming } l_2 = l_4 = \frac{2n+1}{2}\lambda; \text{ and } l_3 = \frac{2n+1}{4}\lambda\right)$$

are connected to obtain the difference of their output voltages, this difference voltage will be $$e_3 - e_4 = 4KF^2 R \sin(p + \beta l_{30} + \beta l_{40}) \sin(\beta l_{40} - \beta l_{30}) \quad (9)$$

where $$l_{30} = l_1 + l_2 + l_3 \text{ and } l_{40} = l_1 + l_2 + l_3 + l_4$$

If it is assumed that $$\beta l_{40} + \beta l_{30} = \frac{2m-1}{2}\pi, \; m = 1, 2, 3 \ldots \quad (10)$$

$$\beta l_{40} - \beta l_{30} = \frac{2r-1}{2}\pi, \; r = 1, 2, 3 \ldots \quad (11)$$

and $r \neq m$
then $$e_3 - e_4 = 4KF^2 R \cos p \quad (12)$$

The above indicated calculation may be employed in several ways to obtain R, the magnitude of the reflection coefficient and $p$ its phase angle. For example, the quantities $(e_1-e_2)$ and $(e_3-e_4)$ may be measured on "current squared" meters and the readings may be added to obtain $R^2$. The factor $4KF^2$ must be determined by other means. The ratio $$\frac{e_1-e_2}{e_3-e_4} = \tan p$$

and thus provides the phase angle $p$ of the reflection coefficient.

A convenient manner of indicating both the magnitude and the phase angle of the reflection coefficient is to employ a cathode ray oscilloscope and to apply a voltage indicative of the quantity $(e_1-e_2)$ to the vertical deflecting electrodes and a voltage indicative of the quantity $(e_3-e_4)$ to the horizontal deflecting electrodes. The deflection of the cathode ray spot from the center of the oscilloscope screen will indicate the magnitude of the reflection coefficient, and the angle the line through the spot and the center makes with the horizontal axis of the oscilloscope indicates the phase angle of the reflection coefficient. If the probe output voltages are of low magnitude, the sensitivity of the cathode ray oscilloscope may be improved by amplitude-modulating the signal generator coupled to the line and utilizing detectors and amplifiers between the probes and the oscilloscope.

In the derivation of Equations 8 and 12, predetermined conditions on the quantities $\beta l_1$, $\beta l_{20}$, $\beta l_{30}$, $\beta l_{40}$, were assumed. Of these conditions Equation 6 alone can be satisfied independently of frequency. Equations 7, 10, and 11 will be satisfied at only a group of discrete frequencies. Recognizing that $$\beta = \frac{2\pi}{\lambda} = \frac{2\pi}{\lambda_0}\frac{\lambda_0}{\lambda} = \frac{2\pi}{\lambda_0}\frac{f}{f_0} \quad (13)$$

Then:

$$\left. \begin{array}{l} \beta l_1 = \beta l_{20} = \frac{\pi}{4}\frac{f}{f_0} \\[4pt] \beta l_1 - \beta l_{20} = \frac{\pi}{2}\frac{f}{f_0} \\[4pt] \beta l_{30} + \beta l_{40} = \frac{\pi}{4}\frac{f}{f_0} \\[4pt] \beta l_{30} - \beta l_{40} = \frac{\pi}{2}\frac{f}{f_0} \end{array} \right\} \quad (14)$$

$$\left. \begin{array}{l} e_1 - e_2 = \left(4KF^2 \sin \frac{\pi}{2}\frac{f}{f_0}\right) R \sin\left(p - \frac{\pi}{4}\frac{f}{f_0}\right) \\[6pt] e_3 - e_4 = \left(4KF^2 \sin \frac{\pi}{2}\frac{f}{f_0}\right) R \sin\left(p + \frac{\pi}{4}\frac{f}{f_0}\right) \end{array} \right\} \quad (15)$$

which may be written $$\left\{ \begin{array}{l} e_1 - e_2 = \left(4KF^2 \sin \frac{\pi}{2}\frac{f}{f_0}\right) R \left[\cos \frac{\pi}{4}\left(1-\frac{f}{f_0}\right) \sin\left(p-\frac{\pi}{4}\right) + \sin \frac{\pi}{4}\left(1-\frac{f}{f_0}\right) \cos\left(p-\frac{\pi}{4}\right) \right] \\[6pt] e_3 - e_4 = \left(4KF^2 \sin \frac{\pi}{2}\frac{f}{f_0}\right) R \left[\cos \frac{\pi}{4}\left(1-\frac{f}{f_0}\right) \cos\left(p-\frac{\pi}{4}\right) + \sin \frac{\pi}{4}\left(1-\frac{f}{f_0}\right) \sin\left(p-\frac{\pi}{4}\right) \right] \end{array} \right. \quad (16)$$

$$\left\{ \begin{array}{l} e_1 - e_2 = \left[4KF^2 \sin \frac{\pi}{2}\frac{f}{f_0} \cos \frac{\pi}{4}\left(1-\frac{f}{f_0}\right)\right]\left[\sin\left(p-\frac{\pi}{4}\right) + \tan \frac{\pi}{4}\left(1-\frac{f}{f_0}\right) \cos\left(p-\frac{\pi}{4}\right)\right] \\[6pt] e_3 - e_4 = \left[4KF^2 \sin \frac{\pi}{2}\frac{f}{f_0} \cos \frac{\pi}{4}\left(1-\frac{f}{f_0}\right)\right]\left[\cos\left(p-\frac{\pi}{4}\right) + \tan \frac{\pi}{4}\left(1-\frac{f}{f_0}\right) \sin\left(p-\frac{\pi}{4}\right)\right] \end{array} \right. \quad (17)$$

and therefore $$\left. \begin{array}{l} (e_1-e_2) - (e_3-e_4) \tan \frac{\pi}{4}\left(1-\frac{f}{f_0}\right) = \left[4KF^2 \sin \frac{\pi}{2}\frac{f}{f_0} \cos \frac{\pi}{4}\left(1-\frac{f}{f_0}\right)\left\{1 - \tan^2 \frac{\pi}{4}\left(1-\frac{f}{f_0}\right)\right\}\right] R \sin\left(p-\frac{\pi}{4}\right) \\[6pt] (e_3-e_4) - (e_1-e_2) \tan \frac{\pi}{4}\left(1-\frac{f}{f_0}\right) = \left[4KF^2 \sin \frac{\pi}{2}\frac{f}{f_0} \cos \frac{\pi}{4}\left(1-\frac{f}{f_0}\right)\left\{1 - \tan^2 \frac{\pi}{4}\left(1-\frac{f}{f_0}\right)\right\}\right] R \cos\left(p-\frac{\pi}{4}\right) \end{array} \right\} \quad (18)$$

From Equation 18 it is seen that if the frequency differs from the nominal frequency $f_0$ by a small amount, correction can be made for the small resultant error by cross-coupling the outputs of the two sets of probes and by recalibrating for the change in sensitivity. Both of these corrections are readily accomplished by the techniques described as follows:

The probes of the reflectometer may be adjusted for equality of sensitivity by terminating the line in its characteristic impedance and by adjusting the probes for equal output voltages or currents. The magnitude of cross-coupling required to compensate for frequency errors may be determined by sliding a reflecting termination along the line and by adjusting the cross-coupling so that when the output of one set of probes is at maximum, the output of the other set of probes is substantially zero. This adjustment should be made with the generator end of the line tuned to have either no reflection or a reflection of such phase that the forward traveling wave is a maximum or minimum value for the same position of the reflection termination which provides an output from the first probe of a maximum value. The sensitivity of the whole reflectometer may be adjusted by utilizing a perfectly reflecting termination on the line and noting that in this instance the reflection coefficient value is unity.

It should be emphasized that the forward wave and consequently the calibration of the reflectometer will vary with the line termination if the generator end of the line is not substantially reflectionless. If it is not practicable to eliminate the generator reflections, the forward travelling wave may be measured separately by a reflectometer of the type described in the copending application identified heretofore, and the determined value thereof may be employed to modify the sensitivity of the instant reflectometer.

An automatic means for compensating for the sensitivity change of the instant reflectometer caused by the change in the magnitude of the forward travelling wave may be provided as follows: The outputs of the two sets of probes and the output of a reflectometer (for example, of the type described in said copending application, which responds to the square of the forward travelling wave), are amplified in three amplifiers each of which has one or more variable gain stages to which may be applied an automatic volume control potential. The amplifier for the forward wave reflectometer utilizes parallel-channel, delayed-action, automatic-volume-control so adjusted that its output is substantially independent of its input. The automatic volume control potential thus derived is applied to control the gain of the other two variable gain amplifiers in a manner whereby their gain is inversely proportional to $F^2$, the square of the magnitude of the forward travelling wave. The output of these two variable gain amplifiers then may be employed in one of the manners described heretofore for indicating the reflecting coefficient.

Another manner of indicating the magnitude of the reflection coefficient for amplitude modulated microwave signals is to filter out all but the fundamental component of the modulation present in the combined outputs of the two pairs of probes, to shift the phase of the output of one pair of probes 90°, to add the outputs of the phase shifter and the other set of probes, and to indicate the resultant voltage which will be proportional to the magnitude of the reflection coefficient. The advantage of this modification of the invention is that the magnitude of the reflection coefficient is indicated directly by a single indicator, thus providing greater convenience and flexibility than the systems first disclosed.

Among the objects of the invention are to provide improved methods of and means for measuring wave reflections on a transmission line or waveguide. Another object is to provide improved methods of and means for determining simultaneously the magnitude and phase of reflected waves on a transmission line or waveguide. A further object is to provide an improved circuit including an indicator for indicating directly the reflection-coefficient on a transmission line or waveguide responsive to modulated microwaves over a wide frequency range. An additional object is to provide an improved method of and means for measuring simultaneously the reflection coefficient and the reflection coefficient phase angle of standing waves on a transmission line or waveguide. A further object is to provide a wide frequency range reflectometer for indicating the reflection coefficient and the phase angle of waves propagated along a transmission line or waveguide. Another object is to provide an improved method of and means for measuring simultaneously the reflection coefficient and phase angle on a transmission line or waveguide and for compensating for sensitivity variations due to variations in the magnitude of forward travelling waves on said line. An additional object is to provide means for compensating for incidental error in the measurements of reflection coefficient and phase angle on a transmission line or waveguide as a function of the frequency of the waves propagated thereon. Other objects of the invention will be apparent from the following description of the structure which may be employed according to the invention and from the appended claims.

The manner in which the invention may be applied to coaxial transmission lines and waveguides is illustrated in the accompanying drawing of which Figure 1 is a schematic diagram of a measuring system according to the invention for use with a coaxial transmission line wherein the measuring system is responsive to the probe currents; Figure 2 is a schematic diagram of a measuring system similar to that illustrated in Fig. 1, wherein the indicators are responsive to probe voltage; Figure 3 is a schematic diagram of a second embodiment of the invention adapted to measurements of waves propagated through a waveguide and providing simultaneous indications of reflection coefficient and phase angle; Figure 4 is a schematic diagram of a modification of the second embodiment of the invention illustrated in Fig. 3 which includes automatic level compensation; and Figure 5 is a schematic circuit diagram of a third embodiment of the invention. Similar reference numerals are applied to similar elements throughout the drawing.

Referring to Figure 1 of the drawing, a coaxial microwave transmission line having concentrically disposed inner and outer conductors 1, 3 is connected between a microwave generator and a load, not shown. Four wave probes including coupling loops 5, 7, 9, 11 are coupled through apertures in the outer line conductor 3 at different points spaced, for example, along the transmission line at distances $l_1$, $l_{20}$, $l_{30}$, $l_{40}$, of reference on the line, from a point such that the distance between loops 5 and 7 is an odd number of half wavelengths, the distance between loops 9 and 11 is an odd number of half wavelengths, the distance between loops 7 and 9 is an odd number of quarter wavelengths at the mean operating frequency. The probes 5 and 7 are connected through oppositely-polarized wave detectors 13, 15 to a first indicator 17 responsive to the difference in output of the detectors 13, 15. Similarly the third and fourth probes 9, 11 are connected through oppositely-polarized wave detectors 19, 21 to a second indicator 23 responsive to the difference in outputs of the two detectors 19, 21. The two indications are combined as indicated heretofore for determining the magnitude and phase angle of the reflection coefficient. It will be noted that the wave probes 5, 7, 9, 11 are inductive current-responsive devices.

Figure 2 is similar in all respects to Fig. 1 with the exception that the wave probes 5', 7', 9', 11' are voltage-responsive capacitive elements instead of the current-responsive inductive elements illustrated in the circuit of Fig. 1.

Figure 3 illustrates the use of capacitive wave probes 5', 7', 9', 11', the degree of penetration of which may be varied with respect to a waveguide 2 connected between an amplitude-modulated microwave generator and a load, not shown. The degree of penetration of the capacitive coupling elements 5', 7', 9', 11' within the waveguide 2 may be adjusted in accordance with the theory stipulated heretofore as indicated by the arrows 4 to adjust the sensitivity of the several probes. The indicators 17 and 23 may be employed as described heretofore with respect to the circuits of Figs. 1 and 2. In addition, the combined outputs of the first and second detectors 13, 15 may be applied to a first amplifier 25 to increase the measurement sensitivity and then may be applied to the vertical deflecting electrodes of a cathode ray oscilloscope 27. Similarly the combined outputs of the third and fourth detectors 19, 21 may be applied to a second amplifier 29 and thence applied to the horizontal deflecting electrodes of the oscilloscope 27. The oscilloscope 27 thus provides a direct indication of both the magnitude and the phase angle of the reflection coefficient. The magnitude of the reflection coefficient will be determined by the radial deflection of the cathode ray trace from its normal center position, and the phase angle will be indicated by the angular rotation of the cathode ray spot from a horizontal line through the normal center position of the cathode ray trace. Variable mutual inductance 28, connected as shown in Fig. 3 provides means for cross-coupling to correct for indication errors due to frequency deviation from the nominal value $f_0$.

The circuit of Figure 4 is similar to that of Fig. 3 with the exception that an automatic-volume-control system is included to compensate for variations in loading or in the magnitude of the signals derived from the microwave generator. The main transmission waveguide 2, connected between the amplitude-modulated microwave generator and the load, has coupled thereto a reflectometer waveguide system of the type described in applicant's copending application identified heretofore. The reflectometer waveguide 6 is coupled into the main waveguide 2 through oppositely-phased inductive coupling elements 31, 33. The end of the reflectometer waveguide 6 remote from the microwave generator is terminated in its characteristic impedance by a suitable resistive element 35. The end of the reflectometer waveguide 6 in the direction of the generator is terminated by a wave detector 37 and a serially-connected blocking capacitor 39. The wave detector 37 may comprise a microwave crystal detector of the tungsten-silicon type generally disclosed in the copending application of Wendell L. Carlson Serial No. 507,755, filed October 26, 1943, now Patent No. 2,427,087, dated September 9, 1947, and assigned to applicant's assignee. The output of the reflectometer wave detector 37 is applied to the input of a first variable-gain amplifier 41 having a conventional automatic-volume-control circuit 43. The automatic-volume-control voltage derived from the automatic-volume-control circuit 43 is applied to stabilize the gain of the first amplifier 41, and also is employed as a gain control potential which is applied to vary the gain of the probe amplifiers 25 and 29, whereby the indications provided on the oscilloscope 27 are substantially independent of the magnitude of the wave which travels in the direction from the generator to the load.

Another embodiment of the invention illustrated in Figure 5 is similar to that described heretofore by reference to the circuit of Fig. 2 with the exception that amplitude-modulated microwave signals derived from the generator may be employed to indicate directly, on a single indicator, the magnitude of the reflection coefficient. As shown in Figure 5, the amplitude-modulated microwave signals are propagated through a waveguide 2 from the generator to a load, not shown. The signals are detected by capacitive voltage responsive probes 5', 7', 9', 11' connected respectively to wave detectors 13, 15 and 19, 21, the outputs of each pair of which are combined in opposite polarity as in the circuit of Fig. 2. The difference of the outputs of the first and second detectors 13, 15 are applied to a first filter 45 which rejects all but the fundamental component of the signal modulation. Similarly the difference of the outputs of the third and fourth detectors 19, 21 are applied to a second filter network 47 which rejects all but the fundamental component of the signal modulation. The output of the first filter 45 is applied to a 90° phase shifter 49. The phase shifted signals derived from the phase shifter 49 and the signals derived from the second filter 47 are applied to a combining network 51 which effectively adds the voltages applied thereto. The resulting voltage derived from the combining network 51 is applied to an indicator 53 which indicates directly the magnitude of the wave reflection coefficient.

Thus it will be noted that the magnitude of the wave reflection coefficient may be indicated directly by the common indicator 53. However, the individual probe indicators 17 and 23 must be employed as described heretofore for determining the phase angle of the reflection coefficient. It should be understood that either the inductive or capacitive probe elements may be employed in any of the embodiments of the invention described heretofore, and that the cathode ray oscilloscope and automatic-volume-control features also may be employed with either coaxial line or waveguide transmission systems.

Thus the invention described comprises improved methods of and means for measuring directly the magnitude of the reflection coefficient and the phase angle of standing waves on a microwave transmission system employing either coaxial lines or waveguides. Separate or common indicators may be employed for indicating the reflection coefficient magnitude and phase angle, and automatic-volume-control means may be employed for providing measurements which are substantially independent of variations in the magnitude of the microwave signals derived from the generator or for compensating for variations in the loading of the system.

I claim as my invention:

1. The method of measuring travelling waves on a radio-frequency transmission line comprising the steps of deriving wave energy from said line at four successive intervals in the direction of wave propagation on said line, detecting said wave energy derived from said line at each of said intervals, combining in opposite polarity said detected energy at successive ones of first and second separate pairs of said four intervals, deriving respectively from said combined detected energy first and second difference voltages, and comparing said difference voltages to provide measurements of the reflection coefficient and the phase angle of reflected waves on said line.

2. The method of measuring travelling waves on a radio-frequency transmission line comprising the steps of deriving wave energy from said line at four successive intervals in the direction of wave propagation on said line, detecting said wave energy derived from said line at each of said intervals, combining in opposite polarity said detected energy at successive ones of first and second separate pairs of said four intervals, deriving respectively from said combined detected energy first and second difference voltages, and comparing said difference voltages to provide simultaneous measurements of the reflection coefficient and the phase angle of reflected waves on said line.

3. The method of measuring travelling waves on a radio-frequency transmission line comprising the steps of aperiodically deriving wave energy from said line at four successive intervals in the direction of wave propagation on said line, detecting said wave energy derived from said line at each of said intervals, combining in opposite polarity said detected energy at successive ones of first and second separate pairs of said four intervals, deriving respectively from said combined detected energy first and second difference voltages, and comparing said difference voltages to provide simultaneous measurements of the reflection coefficient and the phase angle of reflected waves on said line.

4. The method of measuring travelling waves on a radio-frequency transmission line comprising the steps of aperiodically inductively deriving energy from said line at four successive intervals in the direction of wave propagation on said line, detecting said wave energy derived from said line at each of said intervals, combining in opposite polarity said detected energy at successive ones of first and second separate pairs of said four intervals, deriving respectively from said combined detected energy first and second difference voltages, and comparing said difference voltages to provide measurements of the reflection coefficient and the phase angle of reflected waves on said line.

5. The method of measuring travelling waves on a radio-frequency transmission line comprising the steps of aperiodically capacitively deriving energy from said line at four successive intervals in the direction of wave propagation on said line, detecting said wave energy derived from said line at each of said intervals, combining in opposite polarity said detected energy at successive ones of first and second separate pairs of said four intervals, deriving respectively from said combined detected energy first and second difference voltages, and comparing said difference voltages to provide simultaneous measurements of the reflection coefficient and the phase angle of reflected waves on said line.

6. The method of measuring travelling waves on a radio-frequency transmission line comprising the steps of aperiodically deriving energy from said line at four successive intervals in the direction of wave propagation on said line, detecting said wave energy derived from said line at each of said intervals, combining in opposite polarity said detected energy at successive ones of first and second separate pairs of said four intervals, deriving respectively from said combined detected energy first and second difference voltages, adjusting said coupling at said intervals to balance said detected energy, and comparing said difference voltages to provide simultaneous measurements of the reflection coefficient and the phase angle of reflected waves on said line.

7. The method of measuring travelling waves on a radio-frequency transmission line comprising the steps of aperiodically deriving energy from said line at four successive intervals in the direction of wave propagation on said line, detecting said wave energy derived from said line at each of said intervals, combining in opposite polarity said detected energy at successive ones of first and second separate pairs of said four intervals, deriving respectively from said combined detected energy first and second difference voltages, adjusting separately said coupling at each of said intervals to balance said detected energy, amplifying said difference voltages, and visually comparing said amplified difference voltages to provide simultaneous measurements of the reflection coefficient and the phase angle of reflected waves on said line.

8. A reflectometer for measuring travelling waves on a radio frequency transmission line including two pairs of wave probes each aperiodically coupled to said line at successive intervals in the direction of wave propagation on said line, means for detecting wave energy derived from each of said probes, means for combining in opposite polarity said detected energy from said probes of each of said pairs of probes to provide respectively first and second difference voltages, and means for comparing said difference voltages to provide measurements of the reflection coefficient and the phase angle of reflected waves on said line.

9. A reflectometer according to claim 8 wherein the probes of each of said pairs of probes are spaced substantially an odd number of half-wavelengths at the operating frequency, and wherein adjacent probes of different pairs of said probes are spaced substantially an odd number of quarter-wavelengths.

10. A reflectometer according to claim 8 including means for selectively cross-coupling said combined energy derived from said pairs of probes for correcting for indication errors due to frequency deviation from a predetermined value.

11. A reflectometer for measuring travelling waves on a radio frequency transmission line including two pairs of wave probes each aperiodically inductively coupled to said line at successive intervals in the direction of wave propagation on said line, means for detecting wave energy derived from each of said probes, means for combining in opposite polarity said detected energy from said probes of each of said pairs of probes to provide respectively first and second difference voltages, and means for comparing said difference voltages to provide simultaneous measurements of the reflection coefficient and the phase angle of reflected waves on said line.

12. A reflectometer for measuring travelling waves on a radio frequency transmission line including two pairs of wave probes each aperiodically capacitively coupled to said line at successive intervals in the direction of wave propagation on said line, means for detecting wave energy derived from each of said probes, means for combining in opposite polarity said detected energy from said probes of each of said pairs of probes to provide respectively first and second difference voltages, and means for comparing said difference voltages to provide simultaneous measurements of the reflection coefficient and the phase angle of reflected waves on said line.

13. A reflectometer for measuring travelling waves on a radio frequency transmission line including two pairs of wave probes each aperiodically coupled to said line at successive intervals in the direction of wave propagation on said line, means for detecting wave energy derived from each of said probes, means for combining in opposite polarity said detected energy from said probes of each of said pairs of probes to provide respectively first and second difference voltages, separate amplifying means for said difference voltages, and means for comparing said amplified difference voltages to provide simultaneous measurements of the reflection coefficient and the phase angle of reflected waves on said line.

14. A reflectometer for measuring travelling waves on a radio frequency transmission line including two pairs of wave probes, separate adjustable means for aperiodically coupling said probes to said line at successive intervals in the direction of wave propagation on said line, means for detecting wave energy derived from each of said probes, means for combining in opposite polarity said detected energy from said probes of each of said pairs of probes to provide respectively first and second difference voltages, and means for comparing said difference voltages to provide simultaneous measurements of the reflection coefficient and the phase angle of reflected waves on said line.

15. A reflectometer for measuring travelling waves on a radio frequency transmission line including two pairs of wave probes, separate adjustable means for aperiodically coupling said probes to said line at successive intervals in the direction of wave propagation on said line, means for detecting wave energy derived from each of said probes, means for combining in opposite polarity said detected energy from said probes of each of said pairs of probes to provide respectively first and second difference voltages, separate amplifying means for said difference voltages, and oscillographic means for comparing said amplified difference voltages to provide simultaneous measurements of the reflection coefficient and the phase angle of reflected waves on said line.

NATHANIEL I. KORMAN.

REFERENCES CITED

The following references are of record in the file of this patent:

UNITED STATES PATENTS

| Number | Name | Date |
| --- | --- | --- |
| 2,106,713 | Bowen | Feb. 1, 1938 |
| 2,191,271 | Carter | Feb. 20, 1940 |
| 2,375,223 | Hansen | May 8, 1945 |
| 2,403,289 | Korman | July 2, 1946 |

FOREIGN PATENTS

| Number | Country | Date |
| --- | --- | --- |
| 545,936 | Great Britain | June 18, 1942 |